(12) United States Patent
Yamagishi (10) Patent No.: US 10,483,834 B2
(45) Date of Patent: Nov. 19, 2019

(54) VERTICAL SLIDER WITH BUILT-IN MOVABLE COIL LINEAR MOTOR

(71) Applicant: NIPPON THOMPSON CO., LTD., Tokyo (JP)

(72) Inventor: Kazuki Yamagishi, Mino (JP)

(73) Assignee: NIPPON THOMPSON CO., LTD., Tokyo (JP)

(*) Notice: Subject to any disclaimer, the term of this patent is extended or adjusted under 35 U.S.C. 154(b) by 967 days.

(21) Appl. No.: 15/008,716

(22) Filed: Jan. 28, 2016

(65) Prior Publication Data
US 2016/0218609 A1   Jul. 28, 2016

(30) Foreign Application Priority Data
Jan. 28, 2015   (JP) ................................. 2015-014186

(51) Int. Cl.
| | |
|---|---|
| H02K 33/18 | (2006.01) |
| H02K 41/02 | (2006.01) |
| H02K 1/17 | (2006.01) |
| H02K 41/03 | (2006.01) |

(52) U.S. Cl.
CPC ............ *H02K 41/02* (2013.01); *H02K 33/18* (2013.01); *H02K 1/17* (2013.01); *H02K 41/031* (2013.01)

(58) Field of Classification Search
CPC .... H02K 41/031; H02K 41/025; H02K 41/03; H02K 41/02; H02K 33/18; H02K 35/04; H02K 7/1869; H02K 7/1876; H02K 1/34
USPC ............................................... 310/12, 14–25
See application file for complete search history.

(56) References Cited

U.S. PATENT DOCUMENTS

| | | | | |
|---|---|---|---|---|
| 4,763,886 A | * | 8/1988 | Takei | ..................... B23Q 1/621 |
| | | | | 269/73 |
| 2004/0042890 A1 | * | 3/2004 | Hirata | ................ H05K 13/0413 |
| | | | | 414/752.1 |
| 2009/0230785 A1 | * | 9/2009 | Ida | ......................... H02K 41/03 |
| | | | | 310/12.31 |
| 2010/0290871 A1 | * | 11/2010 | Hanamura | ........... H02K 41/031 |
| | | | | 414/225.01 |

(Continued)

FOREIGN PATENT DOCUMENTS

| | | | | |
|---|---|---|---|---|
| GB | 2315371 A | * | 1/1998 | |
| JP | 09253969 A | * | 9/1997 | |

(Continued)

OTHER PUBLICATIONS

KR-20120029712-A (English Translation) (Year: 2012).*

(Continued)

*Primary Examiner* — Mang Tin Bik Lian
*Assistant Examiner* — Alexander Moraza
(74) *Attorney, Agent, or Firm* — Browdy and Neimark, PLLC (57) ABSTRACT

A ball spline shaft integral with a foremost and rearmost nozzle fits into a movable table for an actuator to make sure of high accuracy and high tact operation. A movable table is constituted with a movable table in which a ball spline shaft to provide a ball spline is inserted into a table body. The ball spline shaft having a through-hole has a foremost nozzle at the lower portion thereof and a rearmost nozzle at the top thereof. An outer shell is fastened to the opposite ends of the bed and the ball spline shaft is supported by a pair of the outer shells for reciprocating movement.

6 Claims, 12 Drawing Sheets

(56) References Cited

U.S. PATENT DOCUMENTS

2012/0001499 A1\* 1/2012 Making; Shogo ..... H02K 41/03
  310/12.14

FOREIGN PATENT DOCUMENTS

| JP | 2009219300 A | | 9/2009 |
|----|--------------|---|--------|
| JP | 2009261245 A | \* | 11/2009 |
| JP | 2015097456 A | | 5/2015 |
| KR | 20120029712 A | \* | 3/2012 |

OTHER PUBLICATIONS

JP-2009261245-A (English Translation) (Year: 2009).\*
JP-09253969-A (English Translation) (Year: 1997).\*
https://www.nnerriann-webster.conn/dictionary/actuator (Year: 2019).\*
https://www.merriam-webster.com/dictionary/substrate (Year: 2019).\*
https://www.merriam-webster.com/dictionary/substratum (Year: 2019).\*

\* cited by examiner

VERTICAL SLIDER WITH BUILT-IN MOVABLE COIL LINEAR MOTOR

FIELD OF THE INVENTION

The present invention relates generally to a vertical slider with a linear motor having a built-in movable coil.

BACKGROUND OF THE INVENTION

Recently, a slider with a built-in linear motor is more and more in recent years used in a diversity of instruments including semiconductor manufacturing equipment, assembling machines, measurement instruments and so on. The sliders are also needed compact or downsized and simple in construction while expected to be high in thrust force, accuracy, durability, and convenient to handle and inexpensive. The vertical slider because driven on a vertical shaft is desired to have the movable table in which the weight reduction Is paramount. Moreover, the slider with the built-in movable coil linear motor is required which is reduced in construction, long in stroke length of the table compared with the prior sliders, and further applicable to a variety of usage while convenient to handle.

In a commonly-owned Japanese Laid-open Patent Application No. 2009-219 300, there is disclosed a slider with built-in Linear motors which has a bed of a hooked angular shape in transverse section. The bed is made to have a transverse section less not only in height but also in width thereof and thus made most compact in cross-section. The bed may be determined to have a diversity of the lengths to have various strokes in conformity with uses. The bed is constituted with an elongated rectangular base plate, an upper elongated rectangular plate small in width than the base plate lying in opposition with the rectangular base plate to extend in parallel with the rectangular base plate to provide a predetermined elongated spacing between them, and a side wall connecting integrally opposed side sages of the of the base and the upper plates. With the slider constructed as stated earlier, opposed inside surfaces of the upper plate and the base plate are provided as opposed surfaces of a magnet yoke. Track rails of the linear motion guide unit are installed lengthwise along the edges of the base plate across the area extending out of the opposed inside surfaces. The slider or the linear motion guide unit is fastened to the table moving on the opposed surfaces.

SUBJECT TO BE SOLVED WITH THE PRESENT INVENTION

Meanwhile, the slider with built-in movable coil linear motor as using an armature coil for a coil stay of core type and magnet yoke integral in construction with the U-shaped bed is suitable for semiconductor inspection means because the operating speed is slow in an attitude the table lies in the horizontal. The slider constructed as stated earlier, however, is inevitable when used in vertical type from enlargement of the movable table, heavy its own weight, less thrust power in linear motor, and causing problems of less thrust power in linear motor, and is high accuracy of the movable table and in driving in high accuracy and in high tact of the movable table.

In a commonly-owned prior Japanese Laid-Open Patent Application No. 2015-97 456 there is disclosed a vertical slider with a linear motor having a built-in movable coil, in which the movable table is constituted with a table body having a foremost nozzle at the underside thereof and a rearmost nozzle at the top aide thereof, the bed is constituted with the basement, the plate facing to the basement, and the side plate fastening the basement and the opposite plate each other. The basement is covered with the covering member except for an area lying in opposition to the plate facing to the basement. The vertical slider constituted as stated earlier makes it possible to drive the movable table with high thrust and accuracy. Moreover, the vertical slider is ease for use, rich in durability and safety, and further inexpensive because of less in power conception.

With the vertical slider with a linear motor having a built-in movable coil, nevertheless, the through-hole made in the movable table is connected to a foremost nozzle at the downstream side and connected to a rearmost nozzle at the upstream side. There are provided the linear action guide unit to guide the foremost nozzle mounted to the movable table, and the stroke rotary bushing using the rearmost nozzle as the guide shaft. Thus, it is very difficult to adjust the degree of parallel between center location of the foremost nozzle for sir suction and the reference surface to mount the movable table. In addition, because the foremost and rearmost nozzles are made of members which differ from movable table. An adverse phenomenon is apt to occur that the air leaks out from a clearance between the opposite connecting parts. Moreover, it has been difficult to meet the required accuracy of a distance between that the mounting surface of the metal plate and the center of the foremost nozzle.

SUMMARY OF THE INVENTION

The present invention, therefore, has as its primary object to overcome the problem as described just above and to further provide a vertical slider with a linear motor having a built-in movable coil, in which the linear motor for the driving means is constituted in a movable coil type motor. The through-hole in the ball spline shaft made in the movable table has the foremost nozzle at the lower end thereof and the rearmost nozzle at the upper end thereof to provide a seamless through-hole. The ball spline shaft is fastened to the basement or the bed through the brackets. Correspondingly, the armature assembly is made simple and compact in construction on the movable table and the ball spline shaft is mounted with ease and simplicity. The seamless air passage makes sure of no leakage out of the nozzles. Thus, present invention provides the vertical slider with the linear motor having the built-in movable coil, which is easy to handle, rich in durability and safety, and further less in power consumption to be operated inexpensively.

Means to Solve the Problems

The present invention relates to a vertical slider comprising an elongated plate beds constituting opposing platy magnet yokes, a movable table travelling in a reciprocating manner lengthwise of the bed through a ball spline, field magnets lying on opposed surface of the magnet yokes each constituted with more than one magnets which are arranged lengthwise in such a relation that unlike poles are alternately adjacent each other and also opposed across a gap, and a movable coil linear motor having an armature assembly lying in the gap between the field magnets and having sore than one armature coils is arranged on a coil substrate fastened to the movable table to move in a reciprocating manner relatively to the bed under the electromagnetic mutual relation between a current flow in the armature assembly and the magnetic flux in the field magnet, wherein a hollow ball-spline shaft having a through-hole to make the ball-spline extends through a lengthwise through-hole for the ball spline and the ball spline shaft is supported for sliding movement by means of a first outer shell having balls and fastened to the underneath of the bed and the second outer shell having balls and fastened to an upper portion of the bed, and wherein a foremost nozzle is formed at a lower portion of the through-hole of the ball spline shaft and a rearmost nozzle foremost nozzle is formed at a top side of the through-hole of the ball spline shaft.

The first and second outer shells are fastened with screws to the bed through brackets. Moreover, the ball spline shaft is fastened with threads to the table. With the slider of the present invention, further, the foremost nozzle and the rearmost nozzle of the ball spline shaft have a hollow through-hole identical in diameter across an overall length thereof.

The bed is composed of an elongated rectangular substrate to provide one of the magnet yokes, an opposite upper plate of rectangular shape less in width and length than the substrate arranged in parallel and in opposition to the substrate with keeping a predetermined interval between them to provide another magnet yoke, and a side plate is fastened to any one of the substrate and the opposite upper plate to provide a mounting reference surface for the substrate.

The location opposing to the substrate other than the portions opposing to the opposite upper plate are covered with a covering fastened to the substrate at a predetermined interval and a plane surface of the opposite upper plate opposing to the substrate is made in a reference surface of the linear motor, and wherein a dimension from the reference surface of the substrate to the outside plane of the covering is made in the width dimension of the slider.

With the slider of the present invention, escape holes are made in a part of the covering and a part of the substrate of the bed opposing to outer shells constituting the ball spline, and the outer shells fit into the escape holes in the covering and the escape hole are designed to have dimensions lying within the thickness dimensions of the substrate and the covering. Moreover, the foremost nozzle and the rearmost nozzle for the movable table are constituted to move in a reciprocating manner out of the lengthwise opposite ends of the bed. More than one slider is stacked up in a thickness direction and fastened to a mounting plate and the movable table constitutes an actuator.

Effect of the Invention

With the vertical slider having built-in movable coil linear motor constructed as stated earlier, the ball spline shaft made integrally with the foremost and rearmost nozzles at the upper and lowest ends thereof is inserted and fastened in the through-hole in the table body of the movable table. As a result, the air passages in the foremost and rearmost nozzles are constituted with the through-hole made in the ball spline shaft. Thus, there is provided the movable table which is kept out of air leakage, and very simple in construction and rich in reliability. With the vertical slider of the present invention, moreover, the linear guidance means for the movable table is constituted with the ball spline composed of the ball spline shaft and a pair of b pair of the outer shells. The ball spline shaft is fastened with screws to the through-hole extending through the table body. The outer shells are fastened with screws to the bed through the brackets so that the reciprocating movement of the movable table relative to the bed may be carried out with steady accuracy to provide the slider rich in reliability. With the vertical slider, moreover, as the movable table is supported for sliding movement in a guidance manner by means of a pair of the linear motion guide units, the movable table is allowed to make the reciprocating movement on the bed with extremely stable high accuracy and high tact. The movable table say be made in an actuator light in weight and slim in construction. In addition, since the bed is constituted with the substrate to provide one of the opposed magnet yokes, the opposing plate to constitute another magnet yoke, and the side plate made integral with sides of the rectangular substrate and the opposite upper place, the bed may be made small in height end width in transverse section and further compact and thin in transverse section. The bed may be determined in length in conformity with usage to make it possible to provide the slider which is thin in construction. The vertical slider even plural example eight sliders are stacked is made compact to be nested within a preselected space and further easy to handle because of the table being varied in the length of stroke.

DETAILED DESCRIPTION OF THE PREFERRED EMBODIMENTS

The vertical slider with a linear motor having a built-in movable coil of the present invention is preferably incorporated as an actuator in a diversity of instruments including semiconductor fabricating equipments, assembling machines, measurement/inspection instruments, positioning tables, slide tables and so on. Embodiments of the vertical slider with a linear motor having a built-in movable coil of the present invention will be hereinafter explained in detail with reference to the accompanying drawings.

The vertical slider 20 as shown in FIGS. 1 to 5 has in general a bed 2, a movable table 1, a pair of field magnets 6 and an armature assembly 8. More particularly, the bed 2 is composed of elongated base plates to provide opposed flat magnet yokes. The movable table 1 is allowed to move in a reciprocating manner lengthwise of the bed 2 through a pair of ball splines 60. The field magnets 6 lying on opposed surface of the magnet yokes 17 are each constituted with more than one magnets 7 which are arranged lengthwise in such a relation that unlike poles are alternately adjacent each other and also opposed across a clearance 49 (refer to FIG. 5). The armature assembly 8 has more than one coreless armature coils 9 placed on a coil substrate serving as a coil stay fastened to the movable table 1. The ball spline 60 is constituted with first and second outer shell 14, 15 fastened to the bed 2 and including therein balls (not shown) moving in a circulating manner, and a ball spline shaft 16 having fit into the first and second outer shell 14, 15 in a reciprocating manner and having a guideways 34 to allow the balls rolling through there. The linear motor 30 (refer to FIG. 5) of movable coil type is composed of the opposed field magnets and the armature assembly 8 movable between the opposed field magnets 6. The movable table linear motor is allowed to move in a reciprocating manner relatively to the bed 2 under the electromagnetic mutual relation between a current flow in the armature assembly 8 and the magnetic in the field magnet 6. The linear motor 30 of movable coil type is driven by, for example, a three-phase driving system.

Figure 12:
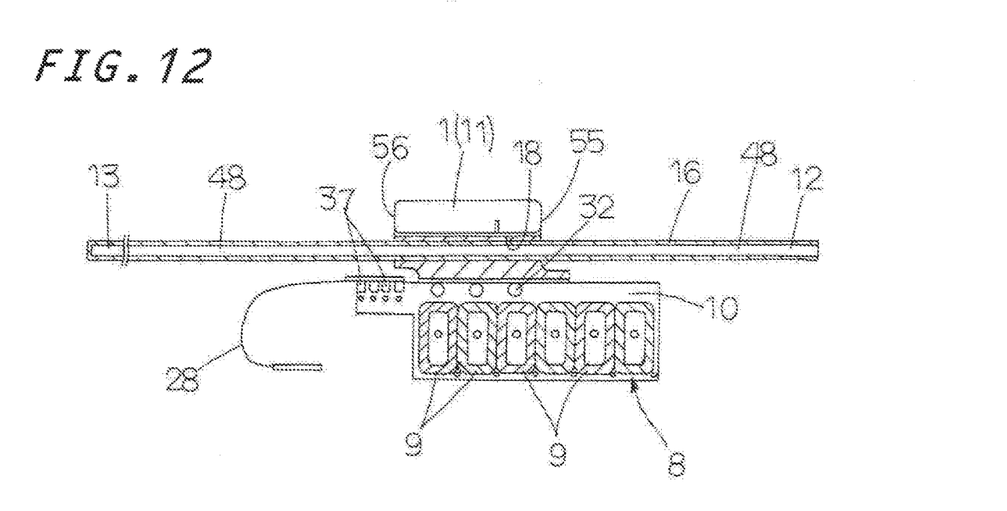
FIG. 12 is in transverse section of the table of FIG. 11, the view being taken on the plane of the line X II-X II of FIG. 11.
Figure 13:
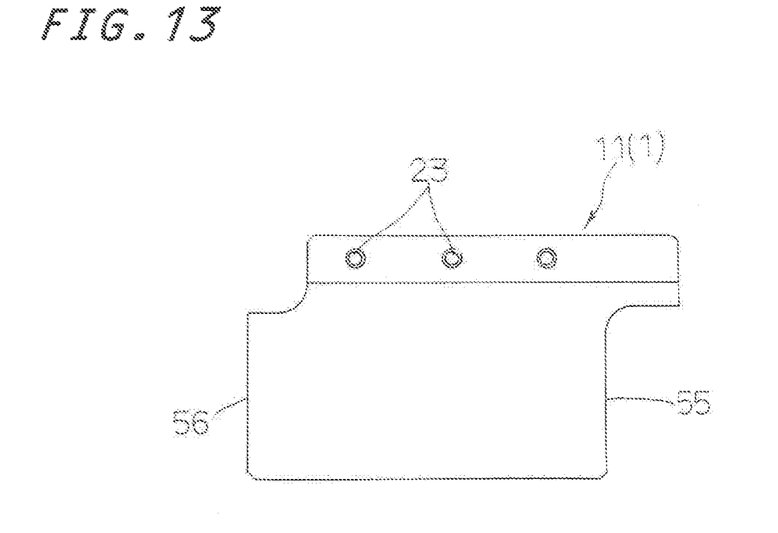
FIG. 13 is an elevation showing a table body of the movable table incorporated in the slider.
Figure 14:
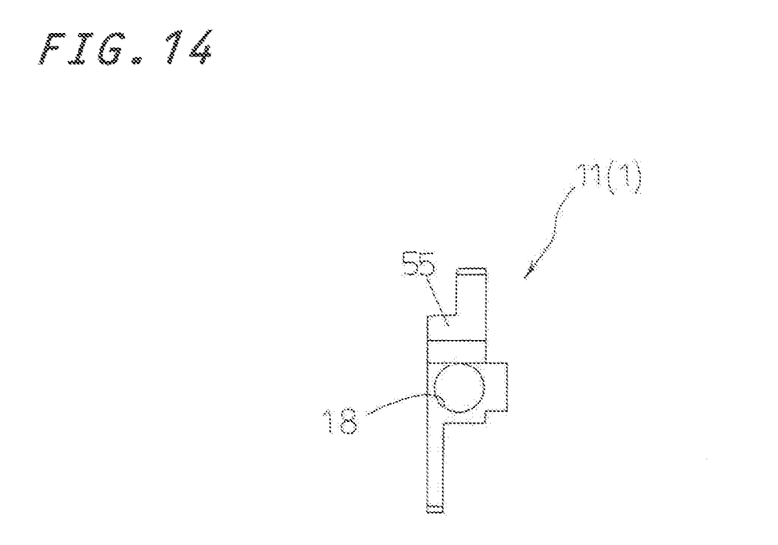
FIG. 14 is an end view showing an end surface of the table body of FIG. 13.
Figure 15:
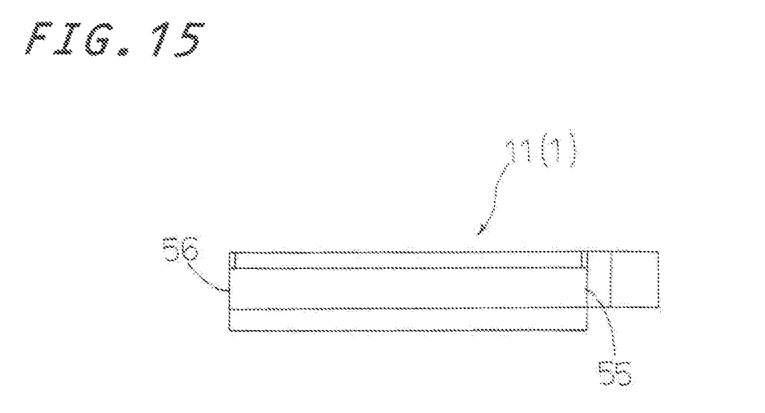
FIG. 15 is a side elevation showing the table body of FIG. 13.
Figure 16:
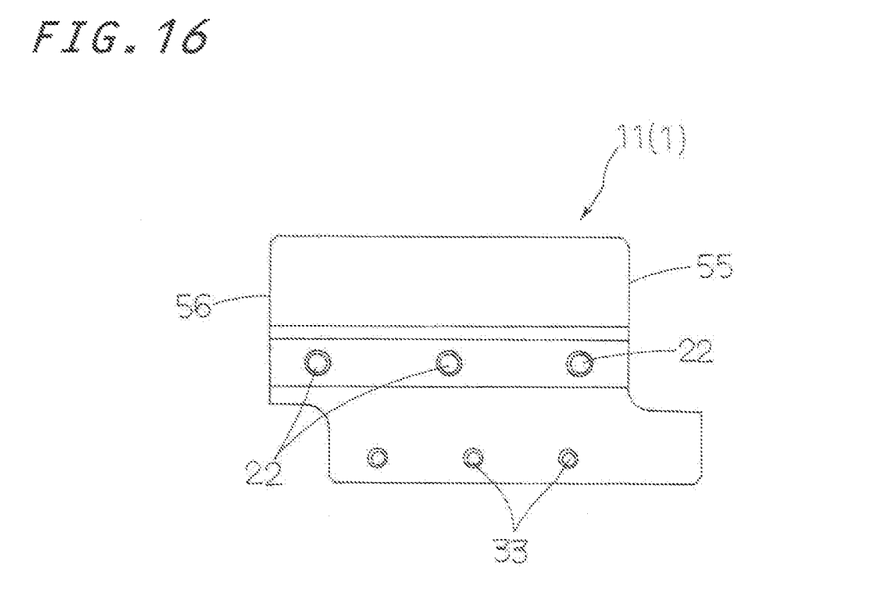
FIG. 16 is a view in front elevation showing the table body of FIG. 13.
Figure 17:
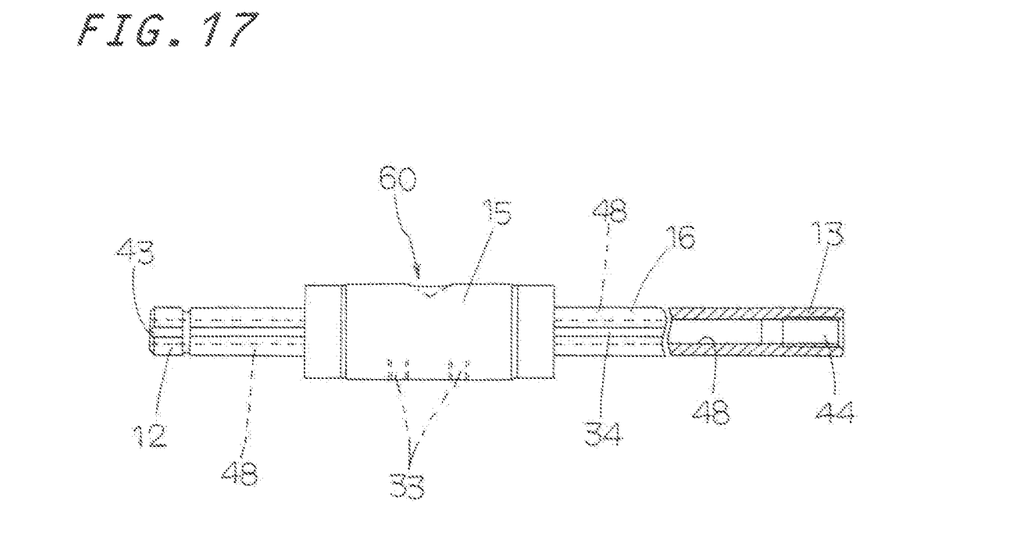
FIG. 17 is a view in front elevation showing a ball-spline shaft fit into an outer shaft in the slider of the present invention.
Figure 18:
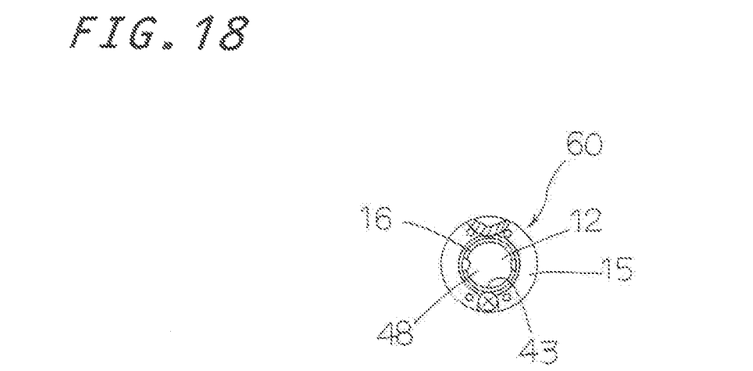
FIG. 18 is an end view showing the ball-spline shaft fit into the outer shaft of FIG. 17.
Figure 19:
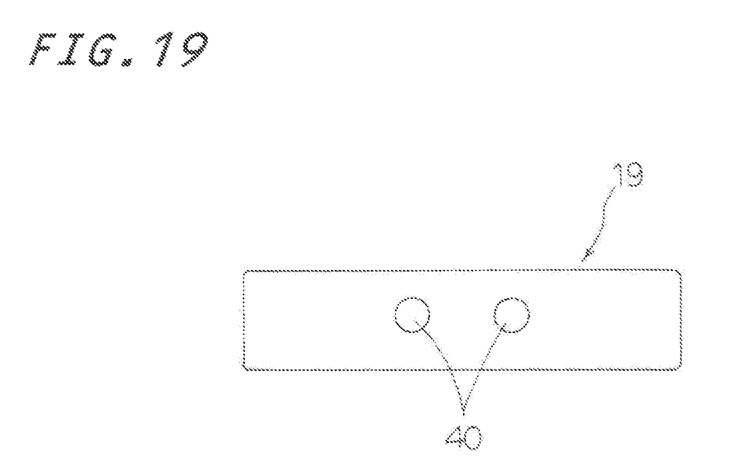
FIG. 19 is a side elevation showing a bracket to be assembled in the slider of the present invention.
Figure 20:
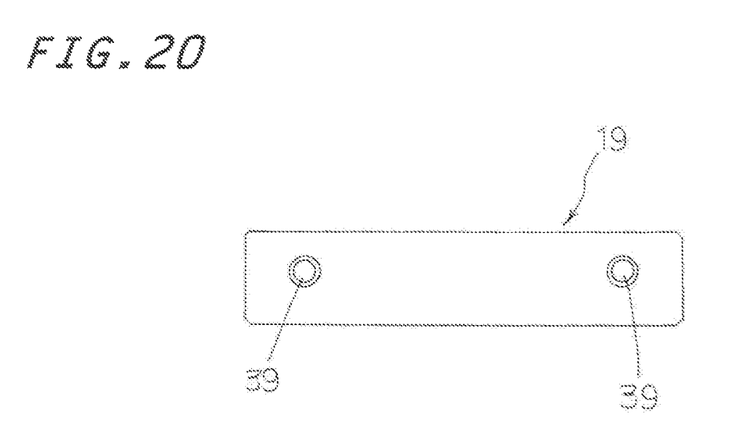
FIG. 20 is a front elevation of the bracket of FIG. 19.

With the preferred embodiment of the vertical slider 20 for example shown in FIG. 12, the magnet 7 in the bed 2 is arranged in opposition to the armature coils 9 lying lengthwise of the movable table 1. The magnet 7 is inserted with using any fastening jig or the like into the hooked shape of the bed 2 or into the clearance 49 between magnet yokes 17 and fastened with an adhesive to the bed 2 of the magnet yokes 17. The field magnet 6 composed of a plurality of rectangular magnetic poles 7, which are arranged on the opposite inside surfaces of the magnet yoke 17. The rectangular magnetic poles 7 are juxtaposed lengthwise of the bed 2 across the whole length of one bed 2 in such a geometric relation that the longer side of the rectangular magnetic pole 7 lies in perpendicular to the longer side of the bed 2 and the adjacent poles are alternately different from each other and the poles opposing across the clearance 49 are different from each other. With the armature assembly 8 born on the movable table 1, the armature coils 9 are juxtaposed lengthwise of the assembly 8 inside the clearance 49 along the direction perpendicular to the lengthwise direction and also the direction in which the cores oppose to the magnetic pole of the field magnet. The armature coils 9 employ a three-phase conduction system of U-, V-, and W-phases in which plural windings applied with each phase of current are constituted as a set of windings, which corresponds to the magnet 7 of the field magnet 6.

Especially, the vertical slider 20 is constituted with a table body 11 having a lengthwise through-hole 18. The hollow ball-spline shaft 16 having a through-hole 48 to make the ball-spline 60 extends through the lengthwise through-hole 18 for the ball spline 60 and mates with threads, not shown, inside a threaded hole 22 on the ball spline shaft 16 to fasten mutually the ball spline shaft 16 with the table body 11. The ball-spline shaft 16 is supported for reciprocating movement by means of the outer shell 15 having balls and fastened to the underneath of the bed 2 and the outer shell 14 having balls and fastened to the upper portion of the bed 2. A foremost nozzle 12 having an air suction port 43 is provided at the lower end of the through-hole 48 in the spline shaft 16 end a rearmost nozzle 13 having an air suction port 44 is provided at the upper end of the through-hole 48 in the spline shaft 16. The outer shells 14, 15 are fastened through brackets 19 by means of screws 21 which are inserted into fastening holes 40 in the brackets 19 and then threaded into threaded holes 33 made in the outer shells 14, 15. The brackets 19 are fastened to the bed 2 by means of screws 52 driven into threaded holes 39. Thus, it will be understood that the outer shells 14, 15 are fastened to the bed 2 through the brackets 19. Moreover, the movable table 1 is made to actuate the bed 2 in vertical direction. The rearmost nozzle 13 lying at upper position fit into the outer shell 14 to be supported and guided by the outer shell 14. The rearmost nozzle 13 is made of a round shaft having an outer diameter to serve as the guide surface for the outer shell 14. Thus, the rearmost nozzle 13 is allowed to make the reciprocating movement on the outer shell 14.

Figure 7:
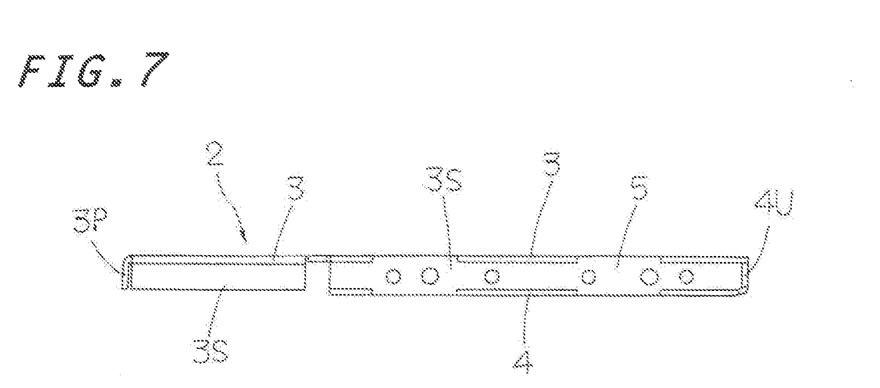
FIG. 7 is a view in side elevation showing one side of the bed of FIG. 6.
Figure 8:
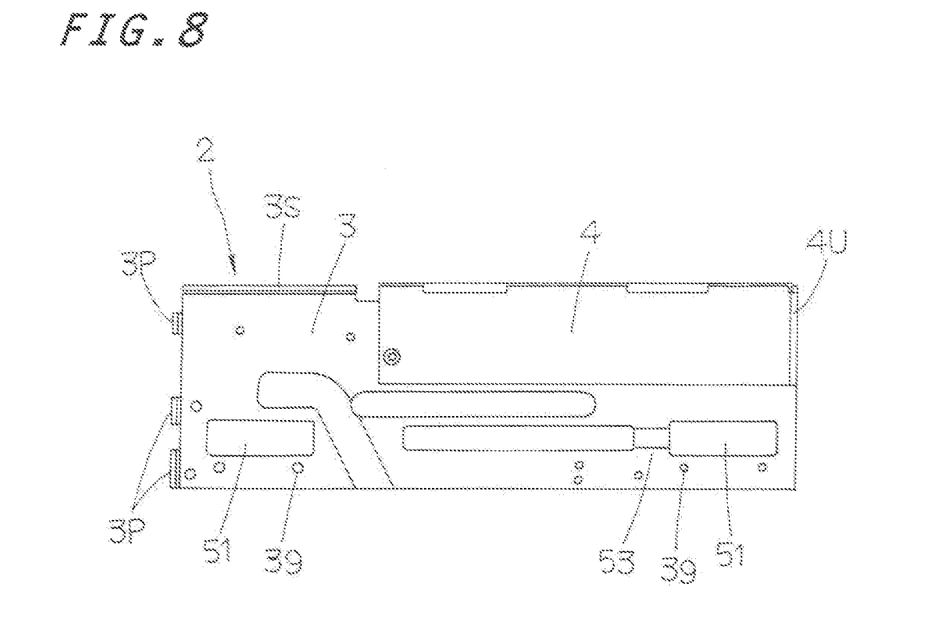
FIG. 8 is a view in front elevation showing the bed incorporated in the slider.
Figure 9:
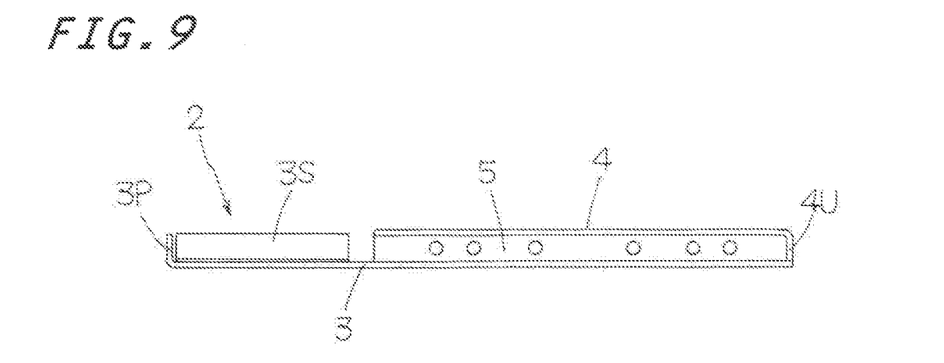
FIG. 9 is a view in side elevation showing the other side of the bed of FIG. 6.
Figure 10:
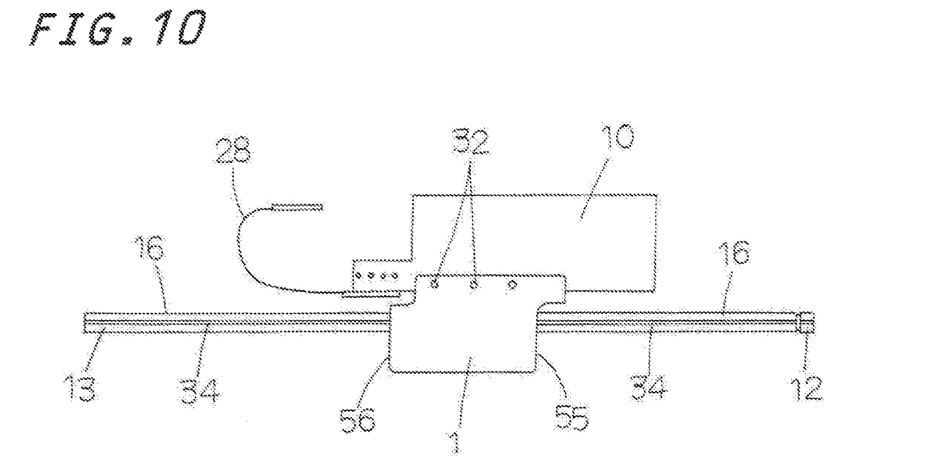
FIG. 10 is a view in rear elevation showing a movable table incorporated in the slider.
Figure 11:
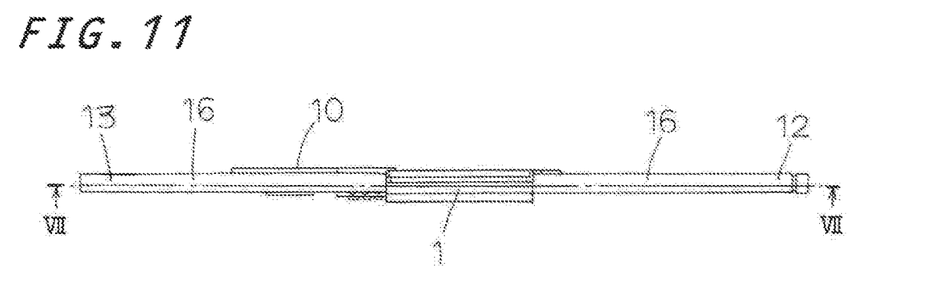
FIG. 11 is a view in side elevation of the movable table of FIG. 10.

Moreover, the bed 2 is made of magnetic material to provide a pair of magnet yokes. The bed 2 is composed of a rectangular substrate 3 to provide one of the magnet yokes 17, an opposite upper plate 4 of rectangular shape shorter and less in width than the substrate 3 to provide another magnet yoke 17 and a side plate 5 made integral with sides of the rectangular substrate 3 and the opposite upper plate 4. The bed 2 as shown in FIGS. 7 to 9 has an angular hooked shape in transverse section when viewed in transverse section perpendicular to the lengthwise direction. Moreover, the substrate 3 has at the upper end thereof an L-shaped upper substrate 3P to cover the upper side of the bed 2 with exception of cut-out 35 locations to accommodate the rearmost nozzle 13, motor cords 26. The substrate 3 and side plate 5 of the bed 2 are subject to the cutting procedure to provide cut surfaces serving as mounting references 53. The opposite upper plate 4 is placed to extend in parallel with the lengthwise side of the substrate 3 to provide a preselected clearance 49 between them. The opposite upper plate 4 is formed shorter in lengthwise direction and smaller in widthwise direction than the substrate 3. The movable table 1 is arranged to move in reciprocating manner in opposition to the substrate 3 along the lengthwise side of the opposite upper plate 4. The table body 11 of the table 1 has fastening threaded holes 23. The stress 32 after having extended through the fastening holes in the coil substrate 10 driven into the threaded boles 23 to faster the coil substrate 10 on the table body 11. The coil substrate 10 fastened to the movable table 1 are located for reciprocating manner in the clearance 49 lying between the substrate 3 and the opposite upper plate 4. Moreover, the coreless armature coils 9 are placed on the coil substrate 10.

Figure 1:
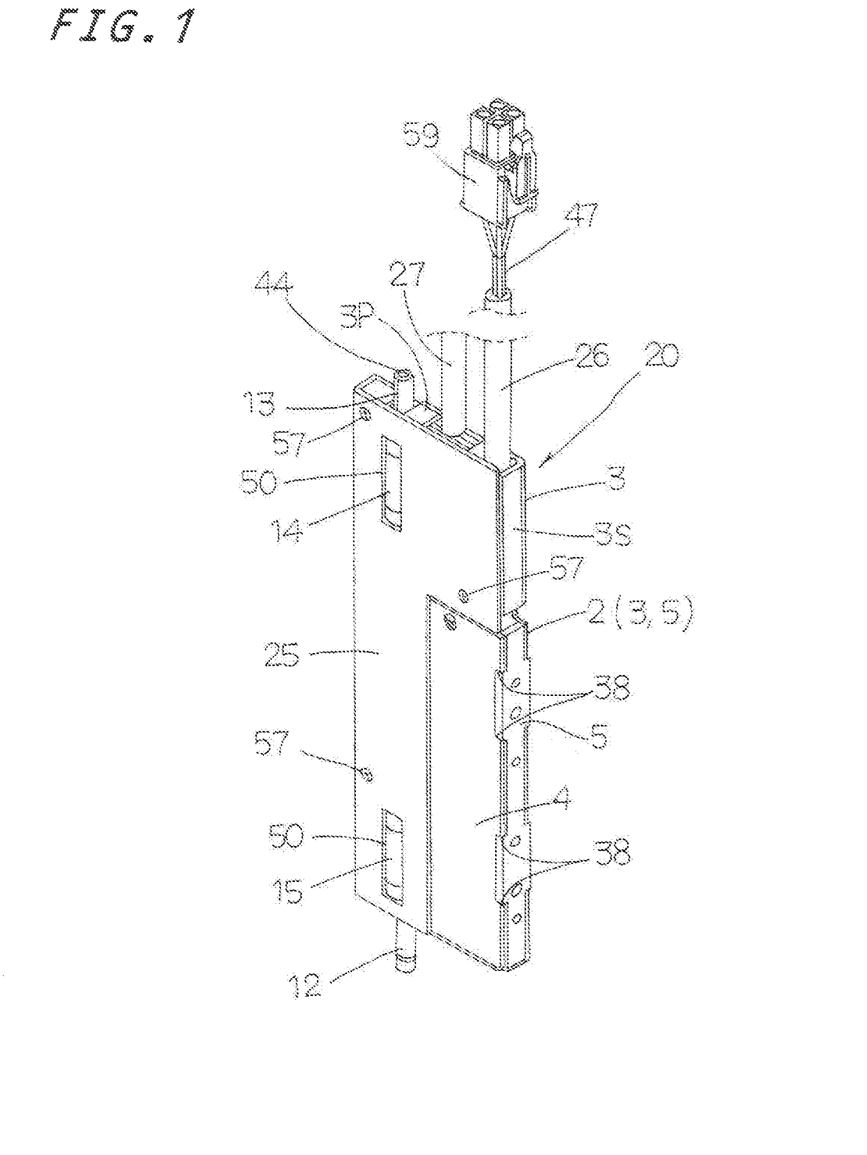
FIG. 1 is a view in perspective showing a preferred embodiment of a slider with a linear motor having a built-in movable coil.
Figure 2:
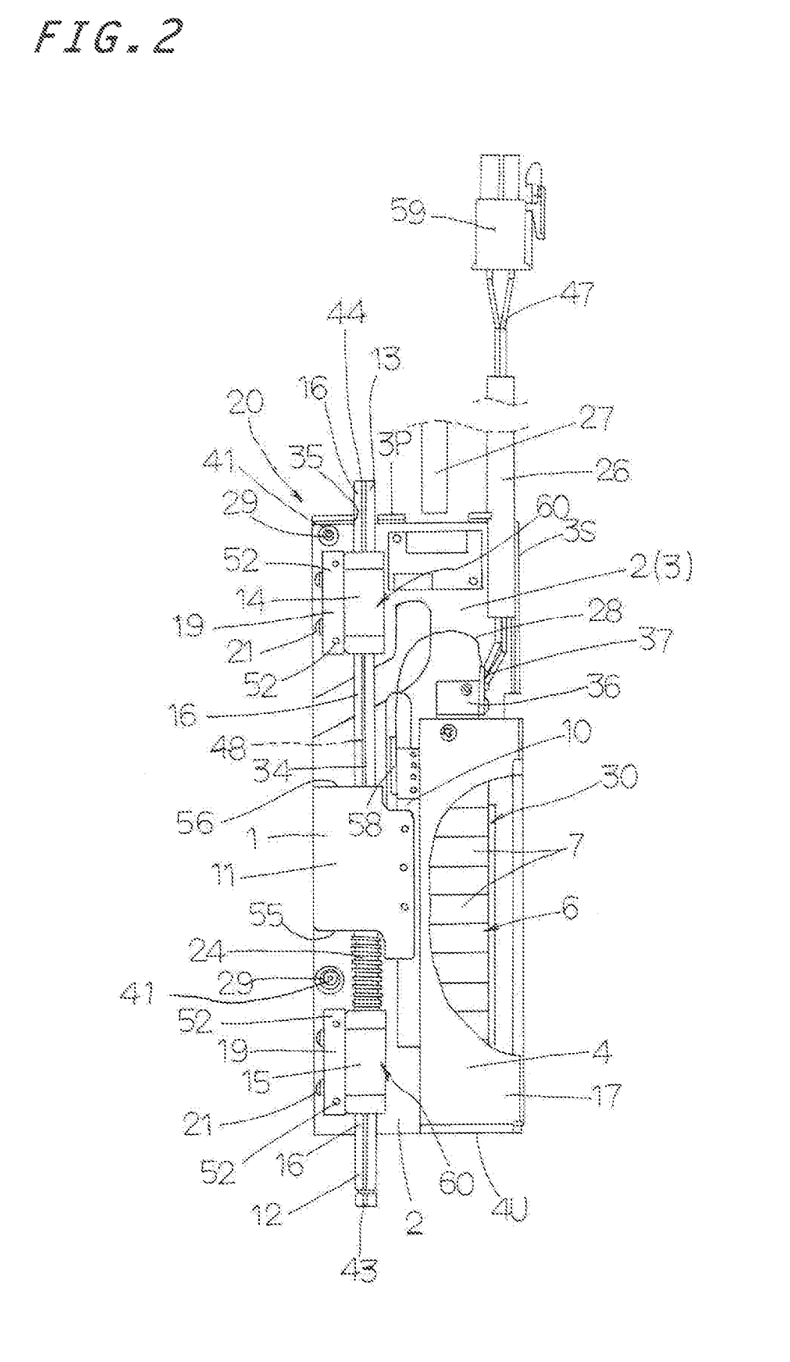
FIG. 2 is a view in front of the slider of FIG. 1, in the view a covering is removed and an opposed plate is partially broken away to illustrate a magnet.
Figure 3:
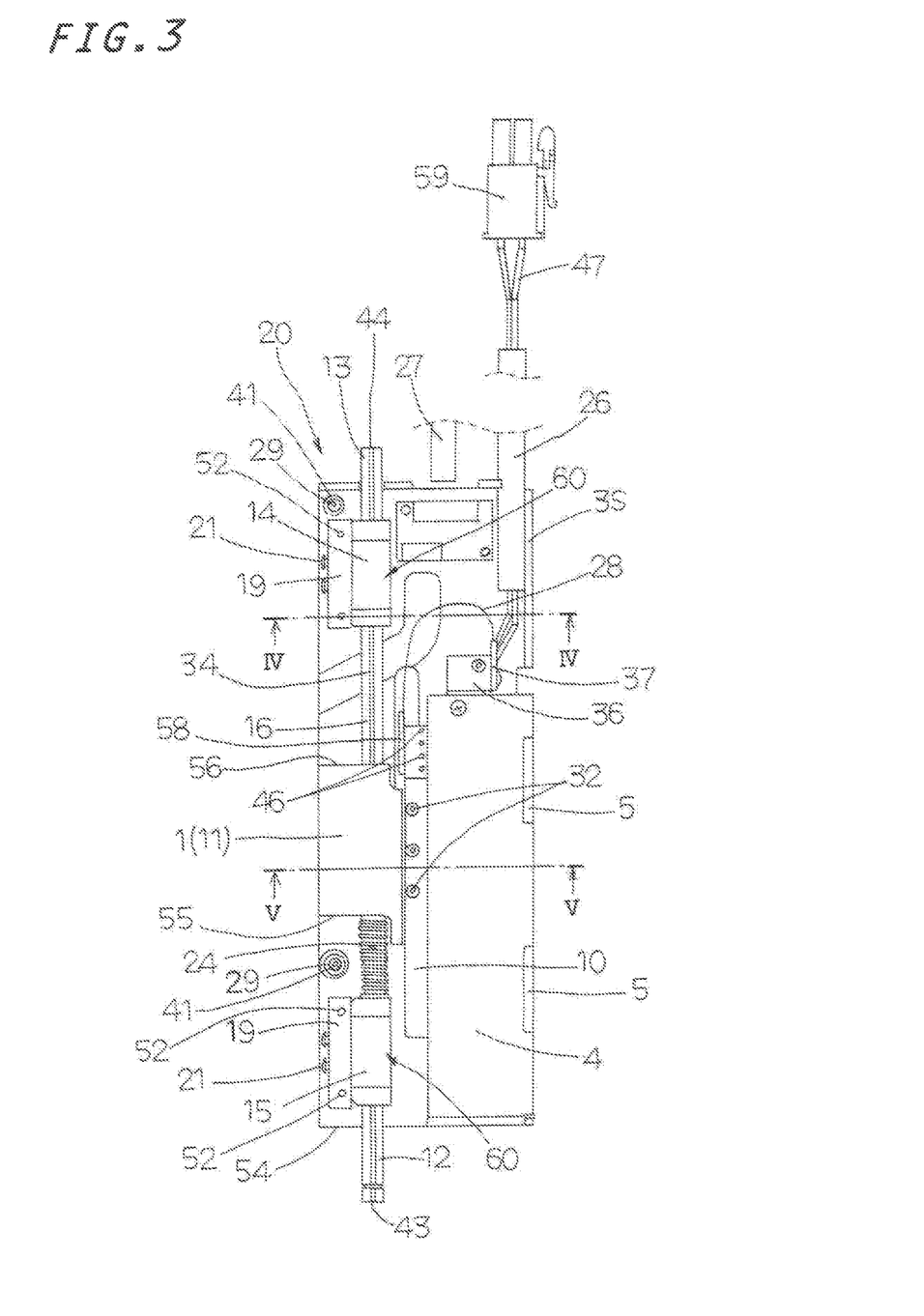
FIG. 3 is a view in front of the slider of FIG. 1, in the view a covering is removed.
Figure 4:
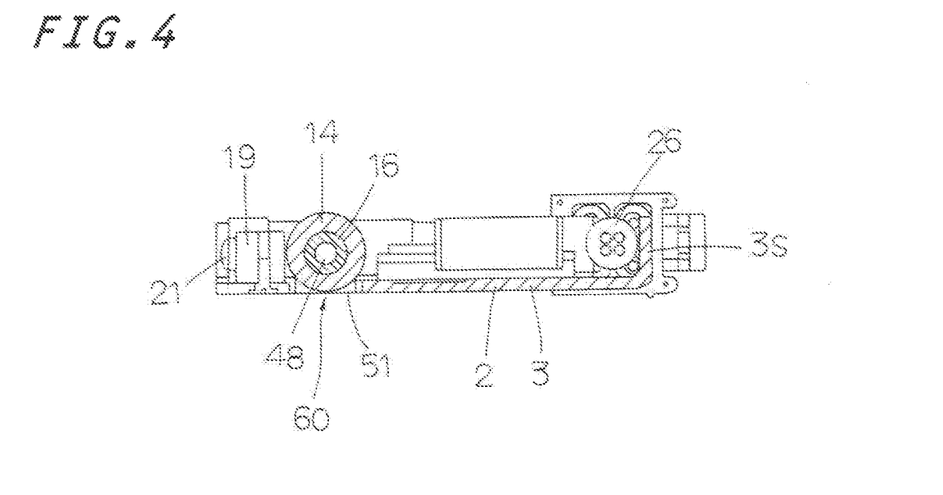
FIG. 4 is a view in transverse section of the slider of FIG. 3, the view being taken on the plane of the line IV-IV of FIG. 3.
Figure 5:
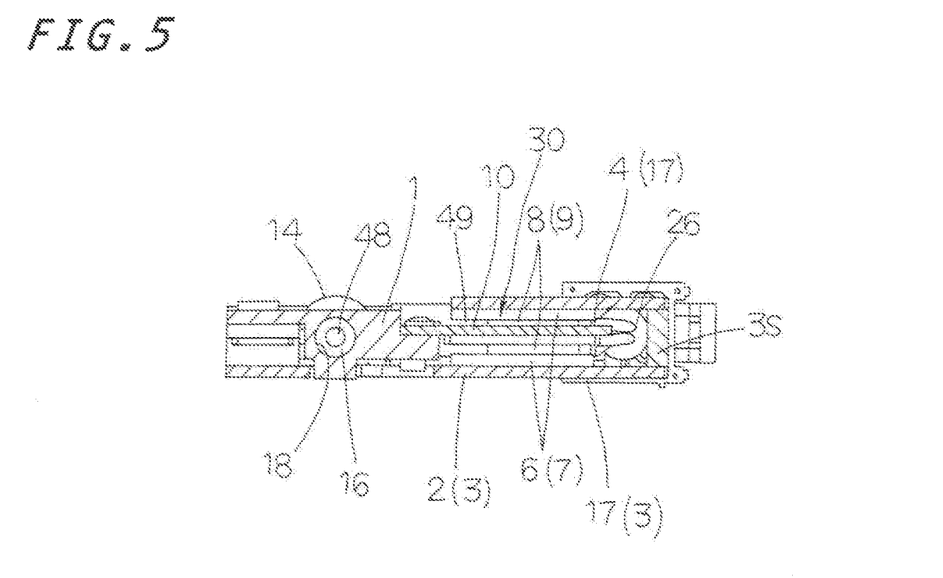
FIG. 5 is a view in transverse section of the slider of FIG. 3, the view being taken on the plane of the line V-V of FIG. 3.
Figure 6:
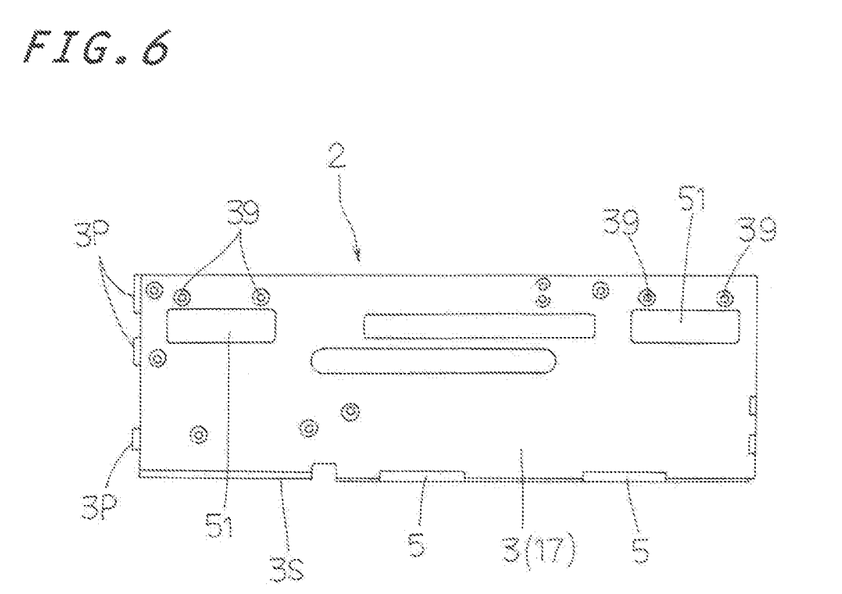
FIG. 6 is a rear elevation showing a bed Incorporated in the slider.

The movable table 1 is allowed to move in a reciprocating manner on the bed 2 through the ball spline shaft 16 because the movable table 1 as shown in FIG. 2 is supported at two locations by the pair of outer shells 14, 15. The outer shells 14, 15 are fastened and supported by the brackets 19 fastened to the bed 2. With the vertical slider 20, moreover, the spring 24 is fastened to the lower end of the bed 2 and fit over the ball spline shaft 16 between the outer shell 15 and the table body 11 so as to urge the movable table 1 towards the upper limit location. That is, the spring 24 fits over the ball spline shaft 16 to bear the movable table 1. With the vertical slider 20, moreover, the foremost nozzle 13 and the rearmost nozzle 13 at the top and the bottom of the ball spline shaft 15 for the movable table 1 are constituted to move in a reciprocating manner out of the lengthwise opposite ends 54 of the bed 21. The reciprocating movement of the movable table 1 is restricted at upper limit and lower limit by means of mechanical stoppers (not shown) made of rubber and the like. The spring 24 to energize the movable table 1 upwards is constituted to get the spring force to collide against stopper to cancel the table's own weight at the reciprocating movement in the vertical movement of the movable table 1.

With the vertical slider 20, the ball spline shaft 16 fits into the through-hole 18 in the table body 11 of the movable table 1. The ball spline shaft 16 has also a hollow through-hole 48 identical in diameter with the through-hole 18. The hollow through-hole 48 may be used for air passage to suck air to attract any other instrument. Any locations opposing to the substrate 3 other than the portions opposing to the opposite upper plate 4 are covered with a covering 25 fastened to the substrate 3 at a predetermined intervals. A plane surface of the opposite upper plate 4 opposing to the substrate 3 is made in a reference surface of the linear motor 30. A dimension from the reference surface of the substrate 3 to the outside plane of the covering 25 is made in the width dimension of the slider 20. The covering 25 conceals the substrate 3 at a location other than the opposite upper plate 4 lying opposed to the substrate 3 of the bed 2. The covering 25 is arranged to protect the clearance 49 between the field magnets 6 of the linear motor 30, and the interiors of the linear encoder and the movable table 1 against invasive foreign matter. The covering 25 is made of a rectangular plate of stainless rectangular plate of stainless material of stain-proof property. The covering 25 is fastened by means of screws 57 which are mated with threaded holes 41 made in upper surfaces of the stays 29.

The bed 2 of the slider 20 is composed of the substrate 3 having an L-shaped upper 3P and an L-shaped side 3S to close between upper ends and side edges of the substrate 3 and the covering 25, and further an L-shaped lower portion 4U of the opposite upper plate 4 closes between the lower edges of the substrate 3 and the opposite upper plate 4. The covering 25 is fastened with screws 57 at a preselected interval to the stays 29. The covering 25 is formed to cover in co-planer with the opposite upper plate 4 in such a way spaced away from the area of the substrate 3 of the bed 2 with exception of the zone of the opposite upper plate 4 constituting the smaller magnet yoke 17. With the vertical slider 20 made generally in the rectangular shape, after the cover 25 has been fastened to the bed 2, the foremost nozzle 12 extrudes below the table body 11 and the rearmost nozzle 13 extrudes above the table body 11. With the vertical slider 20 constructed as stated above, the electric current is applied to the armature assembly 8 through a FPC (Flexible Printed Circuits) 28 connected to a terminal 46 of a connector 58 made on the coil substrate 10. The FPC 28 is connected to a connector 37 equipped or the substrate bracket 30 of the bed 2. A connector 59 is connected to a single core wire 47 coated with synthetic resin tube. The single core wire 47 is connected to an electric power source. The movable table 1 on the rear surface thereof has a linear scale (not shown). The bed 2 has ah encoder head (not shown) to send/receive from the movable table 1. An encoder 27 (refer to FIG. 1) is connected to the encoder head 27 to control and recognize the position of the movable table 1.

With the vertical slider 20 of the present invention, rectangular escape holes 50, 51 are made in a part of the covering 25 and a part of the substrate 3 of the bed 2 opposing to outer shells 14, 15 constituting the ball spline 60. The outer shells 14, 15 fit into the escape hole 50 in the covering 25 and the escape hole 51 are designed to have dimensions lying within the thickness dimensions of the substrate 3 and the covering 25 (refer to FIG. 4). With the vertical slider 20, the ball spline shaft 16 is integrally screwed to a lengthwise end surface or lower surface 55 of the table body 11 of the movable table 1 and ball spline shaft 16 is integrally screwed to the upper end surface 56 or lengthwise other end surface of the table body 11. With the vertical slider 20, the armature assembly 8 is fastened to the movable table 1. The bed 2 is made of magnetic material and provides the magnet yoke 17. The metallic plates for the press-molded substrate 3, opposite upper plate 4 and the side plate 5 are combined in complimentary engagement each ether at their opposing edges and spot-welded at welded portions 38 to make an angular-hooked shape in transverse section.

In order to make parallel adjustment of the guiding means in the vertical slider 20, after the hall spline shaft 16 has been first fastened with screws to the table body 11 of the movable table 1, the movable table 1 is moved over a stroke and then the fastening brackets 19 of the outer shells 14, 15 are fastened with the screws to the bed 2 with viewing sliding state of the movable table 1 relative to the bed 2. Moreover, the slider 20 is made small and most compact in height of transverse section, very powerful in thrust force to make it possible to make smooth sliding property and high speed/high responsibility.

Figure 21:
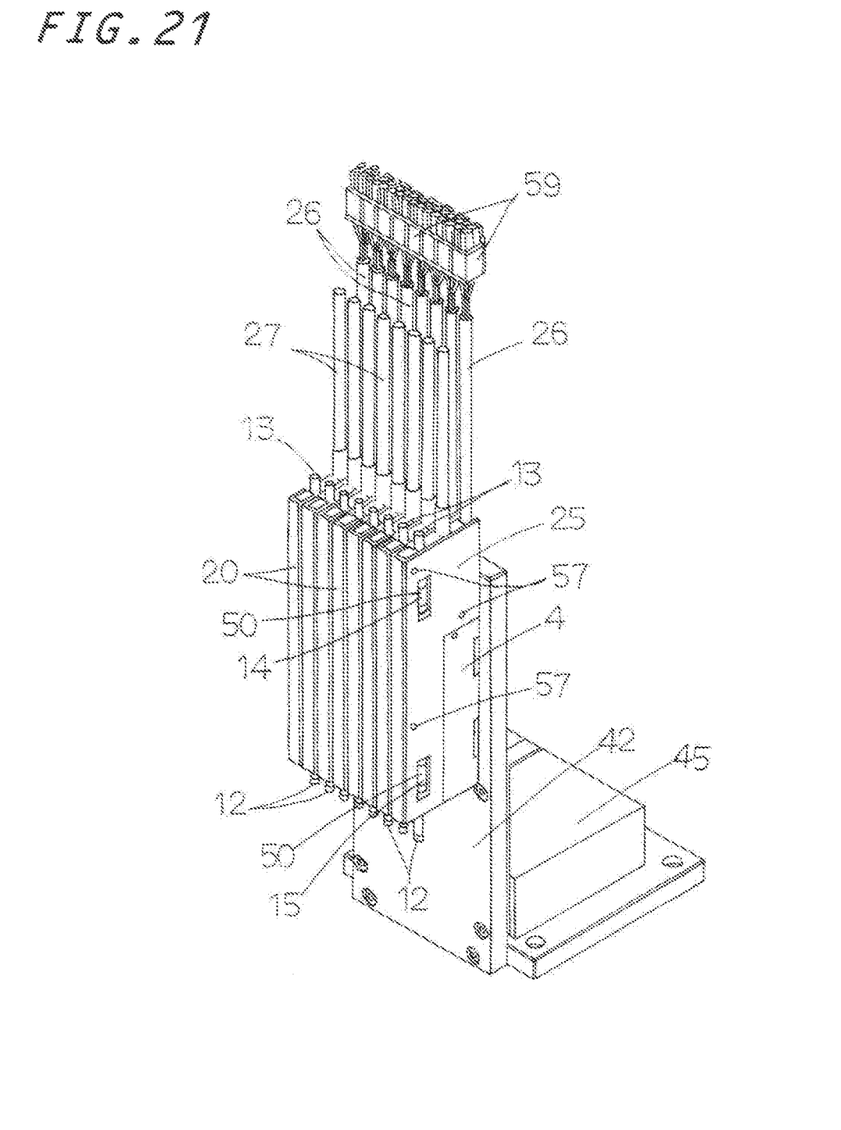
FIG. 21 is a view in perspective showing an embodiment of an actuator in which more than one slider of FIG. 1 (eight shafts) are layered one over the other.

The actuator as shown in FIG. 21 is composed of more than one (for example 8) vertical sliders 20. The actuator is attached to machine bed 45 of, for example, the machinery such as the semiconductor manufacturing equipment through a mounting board 43 to operate the suction head of the machinery.

What is claimed is:

1. A vertical slider comprising: an elongated plate bed constituting opposing plate magnet yokes, a movable table travelling in a reciprocating manner lengthwise of the bed through a ball spline, field magnets lying on opposed surfaces of the magnet yokes each constituted with more than one magnets which are arranged lengthwise in such a relation that unlike poles are alternately adjacent each other and also opposed across a gap, and a movable coil linear motor having an armature assembly lying in the gap between the field magnets and having more than one armature coils is arranged on a coil substrate fastened to the movable table to move in a reciprocating manner relatively to the bed under the electromagnetic mutual relation between a current flow in the armature assembly and the magnetic flux in the field magnet, wherein a hollow ball-spline shaft having a through-hole extends through a lengthwise through-hole of the ball spline shaft is supported for sliding movement by a first outer shell fastened to the underneath of the bed and a second outer shell fastened to an upper portion of the bed, wherein a foremost nozzle is formed at a lower portion of the through-hole of the ball spline shaft and a rearmost nozzle is formed at a top side of the through-hole of the ball spline shaft, wherein the bed is composed of an elongated rectangular substrate to provide one of the magnet yokes, an opposite upper plate of rectangular shape less in width and length than the substrate arranged in parallel and in opposition to the substrate while keeping a predetermined interval between them to provide another magnet yoke, and a side plate is fastened to any one of the substrate and the opposite upper plate to provide a mounting reference surface for the substrate, wherein a location opposing to the substrate other than the portions opposing to the opposite upper plate are covered with a covering fastened to the substrate at a predetermined interval and a plane surface of the opposite upper plate opposing to the substrate is made in a reference surface of the linear motor, and wherein a dimension from the reference surface of the substrate to the outside plane of the covering is made in the width dimension of the slider, and wherein escape holes are made in a part of the covering and a part of the substrate of the bed opposing to outer shells constituting the ball spline, and the outer shells fit into the escape holes in the covering and the escape holes are designed to have dimensions lying within the thickness dimensions of the substrate and the covering.

2. The vertical slider constructed as defined in claim 1, wherein the first and second outer shells are fastened with screws to the bed through brackets.

3. The vertical slider constructed as defined in claim 1, wherein the ball spline shaft is fastened with threads to the table.

4. The vertical slider constructed as defined in claim 1, wherein the foremost nozzle and the rearmost nozzle the ball spline shaft have a hollow through-hole identical in diameter across an overall length thereof.

5. The vertical slider constructed as defined in claim 1, wherein the foremost nozzle and the rearmost nozzle for the movable table are constituted to move in a reciprocating manner out of the lengthwise opposite ends of the bed.

6. The vertical slider constructed as defined in claim 1, wherein more than one slider is stacked up in a thickness direction and fastened to a mounting plate and the movable table constitutes an actuator.

\* \* \* \* \*